(12) United States Patent
Borja

(10) Patent No.: US 10,781,937 B2
(45) Date of Patent: Sep. 22, 2020

(54) ACTUATOR ASSEMBLY AND METHOD OF SECURING AN ACTUATOR TO A VALVE BODY

(71) Applicant: Sun Hydraulics, LLC, Sarasota, FL (US)

(72) Inventor: Andy Borja, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 339 days.

(21) Appl. No.: 15/785,568

(22) Filed: Oct. 17, 2017

(65) Prior Publication Data

US 2019/0113148 A1   Apr. 18, 2019

(51) Int. Cl.
| | | |
|---|---|---|
| *F16K 31/14* | (2006.01) | |
| *F16D 1/08* | (2006.01) | |
| *F16K 31/02* | (2006.01) | |
| *H01F 7/126* | (2006.01) | |

(52) U.S. Cl.
CPC ............... *F16K 31/14* (2013.01); *F16D 1/08* (2013.01); *F16K 31/02* (2013.01); *H01F 7/126* (2013.01)

(58) Field of Classification Search
CPC .................................. F16L 15/04; F16K 31/14
USPC .................................................. 285/355, 354
See application file for complete search history.

(56) References Cited

U.S. PATENT DOCUMENTS

| | | | | |
|---|---|---|---|---|
| 1,718,662 A | * | 6/1929 | Oakley ............... | F16K 15/20 285/355 |
| 2,665,708 A | * | 1/1954 | Ghormley ........... | F16K 31/406 137/493 |
| RE25,338 E | * | 2/1963 | Olson ................. | F16K 31/408 251/30.04 |
| 3,739,846 A | * | 6/1973 | Beson ................. | E21B 33/047 166/89.2 |
| 4,059,291 A | * | 11/1977 | Acda .................. | F16L 47/30 285/423 |
| 4,074,700 A | * | 2/1978 | Engle ................. | B60T 8/3615 137/625.27 |

(Continued)

FOREIGN PATENT DOCUMENTS

| | | |
|---|---|---|
| EP | 2 535 626 | 12/2012 |
| EP | 03 078 036 | 10/2016 |

OTHER PUBLICATIONS

Extended European Search Report prepared by the European Patent Office in application No. 18 199 034.2 dated Mar. 13, 2019.

*Primary Examiner* — David Bochna
(74) *Attorney, Agent, or Firm* — McDonnell Boehnen Hulbert & Berghoff LLP

(57) ABSTRACT

An example actuator assembly includes a valve body having a body locating shoulder as a protrusion from an interior peripheral surface of the valve body, and an actuator having an end that is inserted into the valve body. The end has a first portion with a first diameter and a second portion with a second diameter that is larger than the first diameter, and the second portion includes a threaded region. A locating shoulder is between the first portion and the second portion of the end of the actuator arranged at a position where the first diameter changes to the second diameter. The locating shoulder mates with the body locating shoulder of the valve body when the actuator is inserted and screwed into the valve body to enable alignment of the valve body and the actuator.

18 Claims, 6 Drawing Sheets

(56) References Cited

U.S. PATENT DOCUMENTS

| | | | | |
|---|---|---|---|---|
| 4,258,742 A * | 3/1981 | Louthan | .................. | F16L 47/30 |
| | | | | 285/355 |
| 4,526,340 A * | 7/1985 | Kolchinsky | ............... | H01F 7/16 |
| | | | | 251/38 |
| 4,544,128 A * | 10/1985 | Kolchinsky | ........... | F16K 31/408 |
| | | | | 251/129.03 |
| 4,682,797 A * | 7/1987 | Hildner | .................. | F16L 47/16 |
| | | | | 285/355 |
| 4,703,774 A * | 11/1987 | Seehausen | ............ | F16L 37/002 |
| | | | | 285/25 |
| 4,799,645 A * | 1/1989 | Kramer | ................. | F16K 31/406 |
| | | | | 251/30.04 |
| 4,898,201 A * | 2/1990 | Conley | .................... | B08B 1/00 |
| | | | | 285/355 |
| 5,271,599 A * | 12/1993 | Kolchinsky | ........... | F16K 31/408 |
| | | | | 251/30.01 |
| 5,423,347 A * | 6/1995 | Weber | ................... | F16K 31/406 |
| | | | | 137/102 |
| 5,538,026 A * | 7/1996 | Kazi | ..................... | F16K 31/408 |
| | | | | 137/1 |
| 5,762,087 A * | 6/1998 | Khadim | ................ | F16K 39/024 |
| | | | | 137/1 |
| 5,842,679 A * | 12/1998 | Kolchinsky | ........... | F16K 31/408 |
| | | | | 251/30.04 |
| 5,918,856 A * | 7/1999 | Scharnowski | ...... | F16K 31/0658 |
| | | | | 251/129.07 |
| 5,971,356 A * | 10/1999 | Offenwanger | ............ | F16K 1/00 |
| | | | | 137/614.16 |
| 6,017,015 A * | 1/2000 | Heusser | .................. | F15B 13/01 |
| | | | | 251/30.04 |
| 6,039,120 A * | 3/2000 | Wilkins | .................. | E21B 33/03 |
| | | | | 285/355 |
| 6,390,441 B2 * | 5/2002 | Koyama | ............... | F16K 31/408 |
| | | | | 251/30.03 |
| 6,695,000 B2 * | 2/2004 | Hall | ........................ | F16K 24/02 |
| | | | | 285/354 |
| 7,503,346 B1 * | 3/2009 | Clark | .................... | F16K 31/402 |
| | | | | 137/625.27 |
| 9,677,253 B1 * | 6/2017 | Corneliussen | ......... | F16K 31/14 |
| 2004/0211477 A1 * | 10/2004 | Ezaki | .................... | F25B 41/04 |
| | | | | 137/877 |
| 2007/0084443 A1 * | 4/2007 | Nonoyama | .......... | F02M 51/005 |
| | | | | 123/458 |
| 2008/0099070 A1 * | 5/2008 | Luongo | .................. | F16L 15/04 |
| | | | | 137/15.18 |
| 2009/0261575 A1 * | 10/2009 | Bull | ....................... | F16L 15/04 |
| | | | | 285/32 |
| 2015/0013799 A1 * | 1/2015 | Sarai | ..................... | F16L 15/04 |
| | | | | 137/614.2 |
| 2015/0192217 A1 * | 7/2015 | Suzuki | ................ | F16K 31/0624 |
| | | | | 251/129.19 |
| 2015/0292653 A1 * | 10/2015 | Cody | ..................... | F16L 15/04 |
| | | | | 285/351 |
| 2015/0377377 A1 | 12/2015 | Kainuma et al. | | |
| 2016/0305572 A1 * | 10/2016 | Becker | ................ | F16K 31/0693 |
| 2016/0319626 A1 * | 11/2016 | Dille | ....................... | F16L 15/04 |

\* cited by examiner

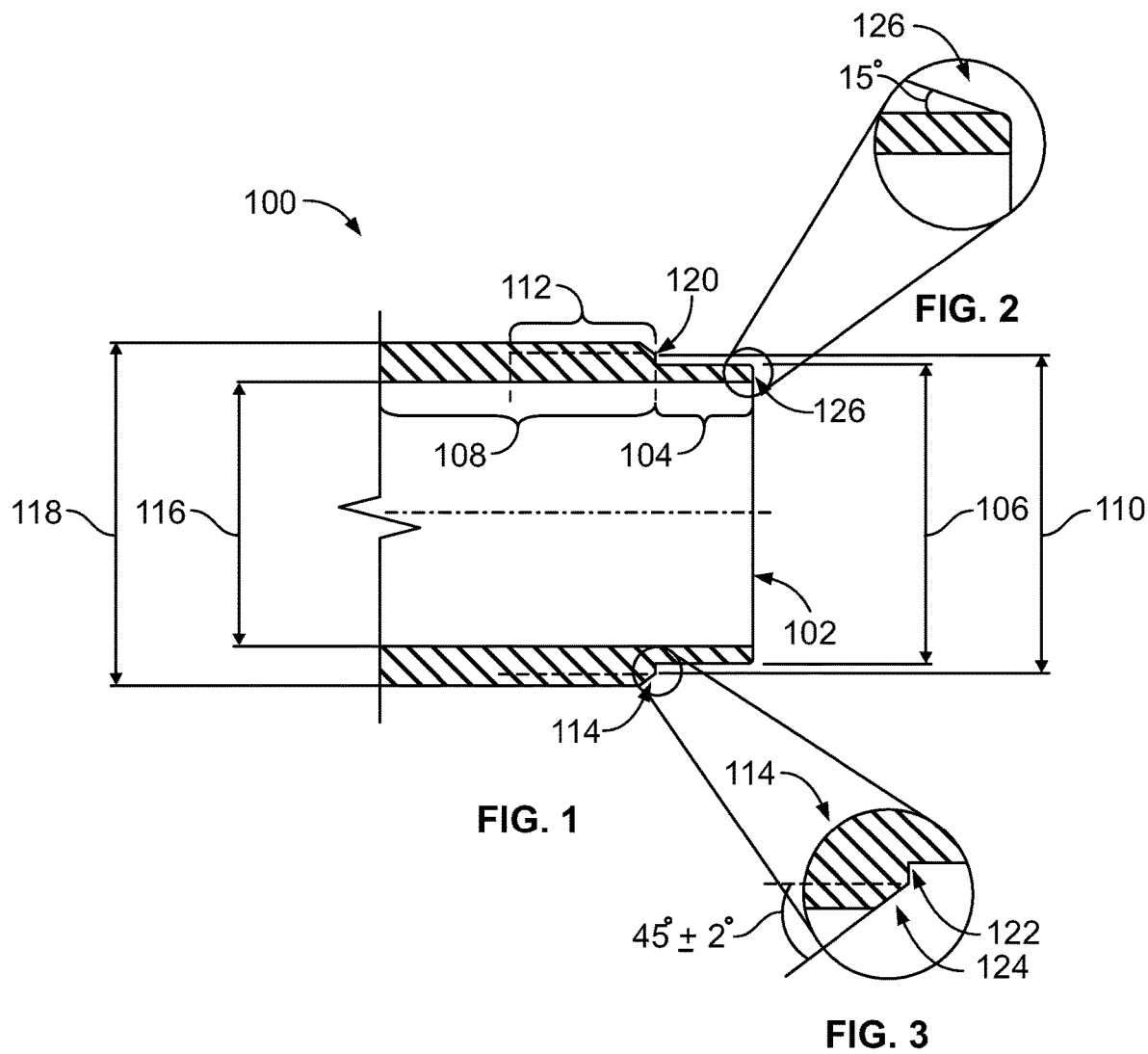

PROVIDING THE SOLENOID TUBE INTERFACE HAVING A THICKNESS OF A WALL OF THE FIRST PORTION MORE THAN TWICE A THICKNESS OF THREADS ON THE THREADED REGION OF THE SECOND PORTION —208

FIG. 12

MAXIMIZING A LOAD BEARING AREA OF THE SOLENOID TUBE INTERFACE, DEFINED AS AN ANNULAR AREA BETWEEN THE FIRST PORTION WITH THE FIRST DIAMETER AND THE SECOND PORTION WITH THE SECOND DIAMETER, DUE TO A THICKNESS OF A WALL OF THE FIRST PORTION BEING MORE THAN TWICE A THICKNESS OF THREADS ON THE THREADED REGION OF THE SECOND PORTION —210

FIG. 13

SEALING THE FIRST PORTION OF THE END OF THE SOLENOID TUBE INTERFACE TO AN INTERIOR PERIPHERAL SURFACE OF THE VALVE BODY USING A SEAL POSITIONED IN A GROOVE DISPOSED IN THE INTERIOR PERIPHERAL SURFACE OF THE VALVE BODY AND ADJACENT THE BODY LOCATING SHOULDER —212

FIG. 14

ACTUATOR ASSEMBLY AND METHOD OF SECURING AN ACTUATOR TO A VALVE BODY

FIELD

The present disclosure generally relates to solenoid assemblies, and more particularly, to solenoid assemblies with actuators having a thickness of a solenoid tube reduced and configured to be removed from the solenoid assemblies for maintenance.

BACKGROUND

Solenoids are used in many industries, and can serve as operating or servo parts for driving valves or the like. Application of solenoids of this type has many varieties, such as within vehicles or aircrafts.

Solenoids are often designed based on working pressures occurring in a housing of the solenoid, which may be high (for example, 200 bar and more). With high pressures, the solenoids are configured to be sufficiently pressure-resistant so as to function reliably and to be leakage-free.

In some examples, components of solenoids are injection molded, and then coupled together with a valve to provide a seal of housings, a coil body, and all casing parts. This enables a highly leakproof area. The components can be crimped onto the valve with seals or brazed onto the valve with solder.

There may be some disadvantages of these example implementations, however. For instance, a number of seals required can increase cost of some designs. Additionally, using crimping prevents easy disassembling and reassembling of the solenoid and valve for maintenance. Furthermore, using brazing, the solenoid and valve assembly may not be flexible and may have a lower tolerance to high pressures.

SUMMARY

In one example, an actuator assembly is described that comprises a valve body having a body locating shoulder as a protrusion from an interior peripheral surface of the valve body, and an actuator having an end that is inserted into the valve body. The end has a first portion with a first diameter and a second portion with a second diameter that is larger than the first diameter. The second portion includes a threaded region, and a locating shoulder is between the first portion and the second portion of the end of the actuator arranged at a position where the first diameter changes to the second diameter. The locating shoulder mates with the body locating shoulder of the valve body when the actuator is inserted and screwed into the valve body to enable alignment of the valve body and the actuator.

In another example, a method of securing an actuator to a valve body is described. The method comprises providing a valve body having a body locating shoulder as a protrusion from an interior peripheral surface of the valve body and inserting an end of an actuator into the valve body. The end has a first portion with a first diameter and a second portion with a second diameter that is larger than the first diameter, and the second portion includes a threaded region. A locating shoulder is between the first portion and the second portion of the end of the actuator arranged at a position where the first diameter changes to the second diameter. The method also comprises screwing the threaded region of the second portion of the end of the actuator into the valve body until the locating shoulder mates with the body locating shoulder of the valve body to enable alignment of the valve body and the actuator.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 1 illustrates a cross sectional view of an example of an actuator, according to an example implementation.

FIG. 2 illustrates a magnified view of a tapered end of the first portion of the actuator, according to an example implementation.

FIG. 3 illustrates a magnified view of the locating shoulder of the actuator, according to an example implementation.

FIG. 12 shows a flowchart of additional functions that may be executed and performed with the method of securing the actuator to the valve body, according to an example implementation.

FIG. 13 shows another flowchart of additional functions that may be executed and performed with the method of securing the actuator to the valve body, according to an example implementation.

FIG. 14 shows another flowchart of additional functions that may be executed and performed with the method of securing the actuator to the valve body, according to an example implementation.

DETAILED DESCRIPTION

Figure 4:
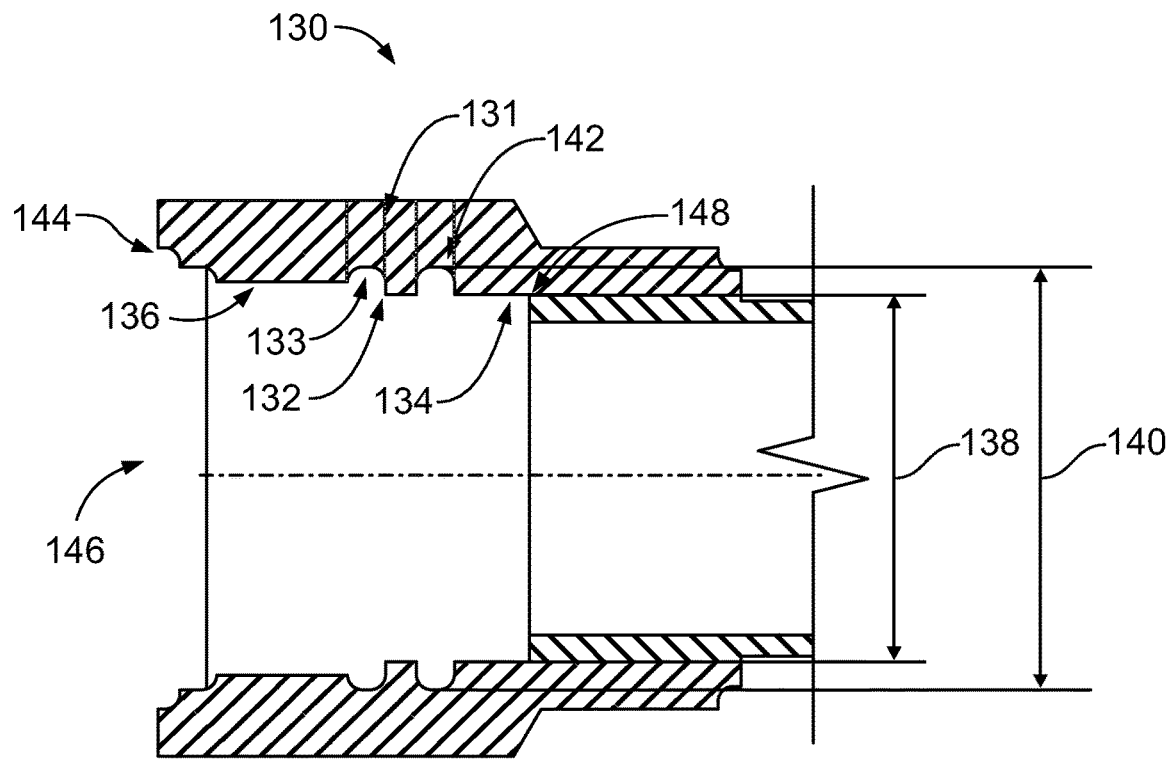
FIG. 4 illustrates a cross sectional view of an example of a valve body, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples described herein, an actuator assembly is described that includes a valve body with a body locating shoulder as a protrusion from an interior peripheral surface of the valve body, and an actuator that has an end that is inserted into the valve body. The end has a first portion with a first diameter and a second portion with a second diameter that is larger than the first diameter, and the second portion includes a threaded region so that the actuator is screwed into the valve body. Within the actuator, there is a locating shoulder that is between the first portion and the second portion and arranged at a position where the first diameter changes to the second diameter. The locating shoulder mates with the body locating shoulder of the valve body when the actuator is inserted and screwed into the valve body to enable alignment of the valve body and the actuator.

Within examples, the body locating shoulder of the valve body and/or the locating shoulder of the actuator may be made of a material (e.g., steel) that when subjected to pressure above a threshold, deforms to maintain a predetermined contact force between the valve body and the actuator.

Within some examples of the actuator, the second diameter is defined to extend to a root of threads of the threaded region of the second portion, and a thickness of threads of the threaded region is about equal to a difference between the first diameter and the second diameter.

In other examples, a load bearing area of the actuator, defined as an annular area between the first portion with the first diameter and the second portion with the second diameter, is maximized due to a relationship between a thread root diameter of the threaded region of the second portion and a thickness of a wall of the first portion of the end of the actuator. The relationship includes a thickness of a wall of the first portion being more than twice a thickness of threads on the threaded region of the second portion. Using such a configuration enables maximizing the load bearing area to make the valve body to actuator connection stronger.

Referring now to the figures, FIG. 1 illustrates a cross sectional view of an example of an actuator 100, according to an example implementation. The actuator 100 is hollow and cylindrical, and has an end 102 that is configured to be inserted into a valve body. The end 102 has a first portion 104 with a first diameter 106 and a second portion 108 with a second diameter 110 that is larger than the first diameter 106. The second portion 108 includes a threaded region 112. The actuator 100 further includes a locating shoulder 114 between the first portion 104 and the second portion 108 of the end 102 of the actuator 100 arranged at a position where the first diameter 106 changes to the second diameter 110. The locating shoulder 114 is adjacent the threaded region 112, for example.

The first portion 104 has the first diameter 106, which may be in a range of about 0.549 to about 0.551 inches (+/−10% in deviation, for example). An internal tube diameter 116 may be in a range of about 0.45 to about 0.46 inches, such that a thickness of a wall of the first portion 104 is less than about 0.1 inches or about 2.5 mm, for example.

The second portion 108 has the second diameter 110, which may be in a range of about 0.584 to about 0.588 inches (+/−10% in deviation, for example). An external tube diameter 118 may be in a range of about 0.627 to about 0.629 inches, for example. The threaded region 112 may be a length of about 0.270 to about 0.272 inches, and a thickness of threads (e.g., major diameter or depth of thread) on the threaded region 112 of the second portion 108 is less than about 1.1 mm (or within a range of about 0.041 to about 0.043 inches), for example. A spacing of threads on the threaded region 112 of the second portion 108 may be about 30-34 threads per inch.

The first portion 104 may have a length of about 0.179 to about 0.183 inches, and the second portion 108 may have a length longer than about 0.3 inches. In some examples, the second portion 108 may be about twice as long as the first portion 104, such that when inserted into a valve body, a length of the second portion 108 inserted into the valve body is twice as long as a length of the first portion 104.

The actuator 100 includes a load bearing area, defined as an annular area between the first portion 104 with the first diameter 106 and the second portion 108 with the second diameter 110. The load bearing area is maximized due to a relationship between a thread root diameter (e.g., minor diameter of thread) of the threaded region 112 of the second portion 108 (e.g., the second diameter 110) and a thickness of a wall of the first portion 104 of the end 102 of the actuator 100. In one example, the relationship includes a thickness of a wall of the first portion 104 (e.g., less than about 2.5 mm) being more than twice a thickness of threads on the threaded region 112 of the second portion 108 (e.g., a thickness of threads on the threaded region 112 of the second portion 108 is less than about 1.1 mm).

By maximizing the load bearing area, once the actuator 100 is inserted into a valve body (described below), a torque can be obtained for a connection between the actuator 100 to the valve body to a value that will prevent separation of the actuator 100 from the valve body under pressure. Thus, to maximize the annular area, the second diameter 110 is made as large as possible under design constraints and the first diameter 106 is made as small as possible under design constraint. To maximize the second diameter 110, a thread length is used that has a minimal root diameter, but is still easy to manufacture and is not susceptible to cross threading. This allows for the second diameter 110 to be a maximum given such constraints. Then, to minimize the first diameter 106, a thickness of the wall of the first portion 104 is made as thin as possible while still maintaining a strength required to keep deformation to a minimum.

With these constraints and optimizations being made, and using the configuration and relative sizing of portions of the actuator 100 as described, a thickness of a wall of the first portion 104 may be more than twice a thickness of threads on the threaded region 112 of the second portion 108 (e.g., a thickness of a wall of the first portion 104 is less than about 2.5 mm and a thickness of threads on the threaded region 112 of the second portion 108 is less than about 1.1 mm).

In addition, as shown in FIG. 1, the second diameter 110 is defined to extend to a root 120 of threads of the threaded region 112 of the second portion 108, and a thickness of threads of the threaded region 112 is about equal to a difference between the first diameter 106 and the second diameter 110. For example, a thickness of threads on the threaded region 112 of the second portion 108 is less than about 0.041 to about 0.043 inches, and a difference between the first diameter 106 and the second diameter 110 is about 0.035 to about 0.037 inches.

With reference to FIG. 1, many measurements are described for features of the actuator 100. Such measurements are examples only, as the features may be different sizes depending on different design considerations. Such features may retain relative sizing differences and proportions, within examples, as an overall size of the components may change. In addition, by the term "about" used above and throughout the description herein, it is meant that the recited characteristic, parameter, measurement, or value need not be achieved exactly, but that deviations or variations, including for example, tolerances, measurement error, measurement accuracy limitations, manufacturing deviations, and other factors known to skill in the art, may occur in amounts that do not preclude the effect the characteristic was intended to provide.

FIG. 2 illustrates a magnified view of a tapered end 126 of the first portion 104 of the actuator 100, according to an example implementation. The illustration in FIG. 2 is shown on a scale of about 8:1, for example. The actuator 100 is hollow and the first portion 104 is at an opening of the actuator 100 and is inserted into the valve body ahead of the second portion 108, and the first portion 104 includes the tapered end 126 which will abut the valve body after insertion. The tapered end 126 may be configured at about 15° (+/−1°), for example. A length of the taper may be about 0.015 to about 0.020 inches, for example.

FIG. 3 illustrates a magnified view of the locating shoulder 114 of the actuator 100, according to an example implementation. The illustration in FIG. 3 is shown on a scale of about 12:1, for example. The locating shoulder 114 includes a corner 122 defined by the first diameter 106 changing to the second diameter 110. The corner 122 is shown as a 90° corner for an abrupt change in the diameter; however, a less abrupt change may be used. The locating shoulder 114 also includes a tapered portion 124 abutting the corner 122 and leading into threads of the threaded region 112 of the second portion 108. The tapered portion 124 may be configured at about 45° (+/−2°), for example.

The load bearing area described in FIG. 1 serves as a datum or the locating shoulder 114 of the actuator 100. The locating shoulder 114 enables alignment of the actuator 100 with the valve body (described below).

FIG. 4 illustrates a cross sectional view of an example of a valve body 130, according to an example implementation. The valve body 130 has an arm 131 on which a body locating shoulder 132 is configured as a protrusion from an interior peripheral surface 134 of the valve body 130. The body locating shoulder 132 serves at a stop for insertion of the actuator 100, such that when the actuator 100 is inserted and screwed into the valve body 130, the locating shoulder of the actuator 100 mates with the body locating shoulder 132 of the valve body 130 to enable alignment of the valve body 130 and the actuator 100.

The body locating shoulder 132 may have a width of about 0.045 to about 0.049 inches. The valve body 130 includes a shoulder recess 133 into which the locating shoulder 114 of the actuator 100 is positioned when inserted into the valve body 130, for example, such that the locating shoulder 114 abuts the body locating shoulder 132. The shoulder recess 133 may be about 0.047 inches wide, for example.

The valve body 130 includes internal threads 136 along a portion of the interior peripheral surface 134, adjacent to the recess 133, that mate with threads of the threaded region 112 of the second portion 108 of the end 102 of the actuator 100. A length of the internal threads 136 may be about 0.271 inches (e.g., to match a length of the threaded region 112 of the actuator 100).

The valve body 130 also has a first internal diameter 138 that is large enough to accommodate the first diameter 106 of the actuator 100. In one example, the first internal diameter 138 is in a range of about 0.552 to about 0.554 inches (+/−10% in deviation, for example).

The valve body 130 also has a second internal diameter 140 that is large enough to accommodate the second diameter 110 of the actuator 100. In one example, the second internal diameter 140 is in a range of about 0.59 to about 0.60 inches (+/−10% in deviation, for example).

The valve body 130 includes a groove 142 disposed in the interior peripheral surface 134 of the valve body 130 and adjacent the body locating shoulder 132. A seal may then be positioned in the groove 142 and circumferential to the actuator 100 with the actuator 100 inserted into the valve body 130. The groove 142 may be about 0.056 to about 0.060 inches wide.

The valve body 130 further includes a recess 144 disposed in the interior peripheral surface 134 of the valve body 130 and adjacent an opening 146 of the valve body 130. Another seal may then also be positioned in the recess 144 and circumferential to the threaded region 112 of the second portion 108 of the end 102 of the actuator 100 with the actuator 100 inserted into the valve body 130. The recess 144 may be about 0.030 to about 0.032 inches wide.

The valve body 130 further includes a corner 148 that may abut with the tapered end 126 of the first portion 104 of the actuator 100 with the actuator 100 fully inserted into the valve body 130, for example. In some examples, a length of the arm 131 from the body locating shoulder 132 to the corner 148 may be about 0.217 to about 0.219 inches to accommodate a length of the first portion 104 of the actuator 100 as well as to provide a small buffer of space between the corner 148 and the tapered end 126 enabling spacing for manufacturing tolerances and/or further components to be inserted.

Figure 8:
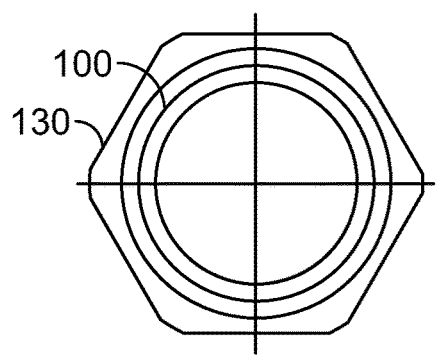
FIG. 8 illustrates an end view of the actuator inserted into the valve body, according to an example implementation.

In some examples, the valve body 130 has an exterior surface in a form of a hexagonal shape, and may comprise plastic, metal (e.g., steel), or a combination of materials (e.g., shown below in FIG. 8).

Figure 5:
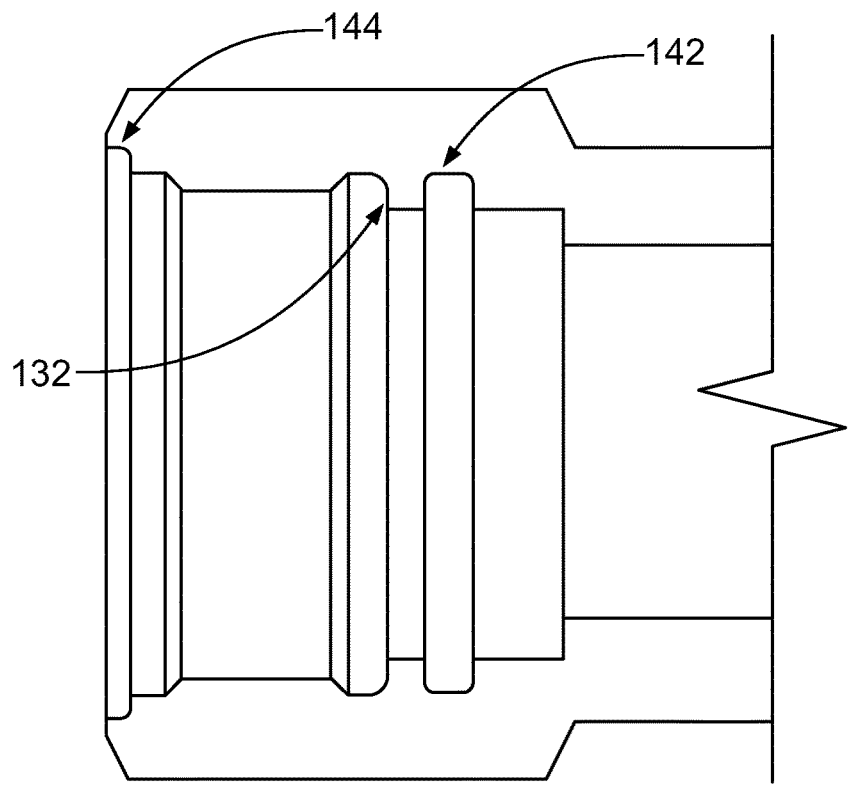
FIG. 5 illustrates a semi-cross sectional view of a portion of the valve body showing further internal features, according to an example implementation.

FIG. 5 illustrates a semi-cross sectional view of a portion of the valve body 130 showing further internal features, according to an example implementation. In FIG. 5, the body locating shoulder 132, the groove 142, and the recess 144 are shown along a circumference of the interior peripheral surface 134 of the valve body 130.

Figure 6:
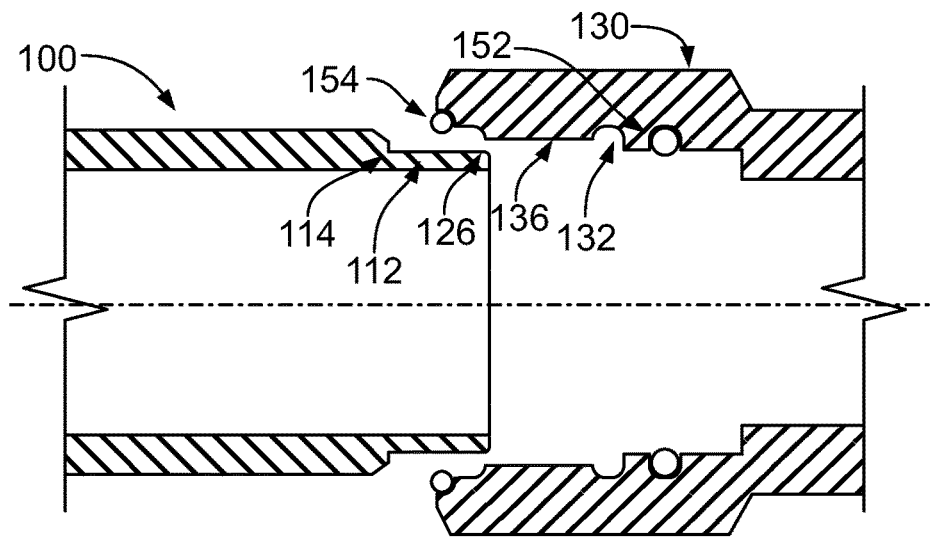
FIG. 6 illustrates a cross sectional view of the actuator being inserted into the valve body, according to an example implementation.
Figure 7:
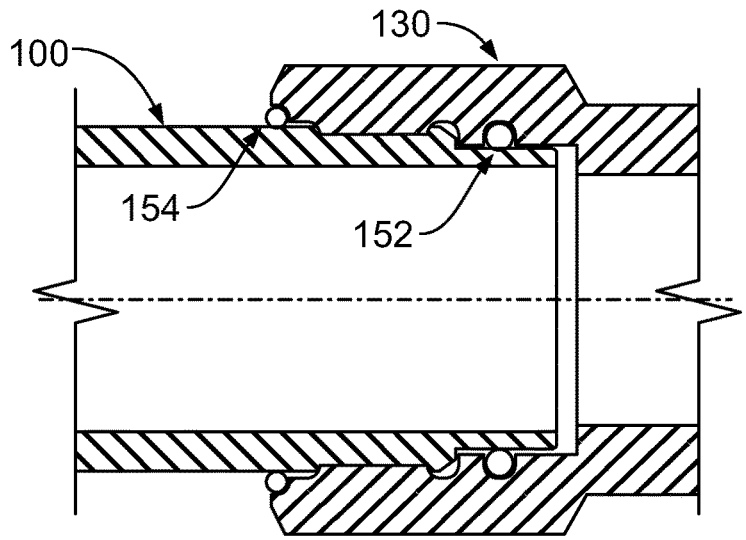
FIG. 7 illustrates a cross sectional view of the actuator inserted into the valve body, according to an example implementation.

FIG. 6 illustrates a cross sectional view of the actuator 100 being inserted into the valve body 130, according to an example implementation. FIG. 7 illustrates a cross sectional view of the actuator 100 inserted into the valve body 130, according to an example implementation. FIG. 8 illustrates an end view of the actuator 100 inserted into the valve body 130, according to an example implementation.

As shown in FIGS. 6 and 7, the end 102 of the actuator 100 is inserted and screwed into the valve body 130 up to a point longitudinally along the end 102 (e.g., along the second portion 108 of the end 102) such that the locating shoulder 114 of the actuator 100 abuts the body locating shoulder 132 of the valve body 130. Threads of the threaded region 112 on the second portion 108 extend longitudinally along the second portion 108 from the locating shoulder 114 to the point.

As described above, in some examples, the second portion 108 may be about twice as long as the first portion 104, such that when inserted into the valve body 130, a length of the second portion 108 inserted into the valve body 130 is twice as long as a length of the first portion 104. This enables a longer portion of the actuator 100 to accommodate threads on the threaded region 112, for example, such that the internal threads 136 of the valve body 130 mate with the threaded region 112 of the actuator 100. The relative lengths of the first portion 104 and the second portion 108 also provide a balance between a lead in portion into the valve body 130 that is not too narrow, while still providing an area of the actuator 100 for the locating shoulder 114.

In some examples, a seal 152 is positioned in the groove 142 disposed in the interior peripheral surface 134 of the valve body 130 and adjacent the body locating shoulder 132. The seal 152 is positioned circumferential to the first portion 104 of the end 102 of the actuator 100 with the actuator 100 inserted into the valve body 130, as shown in FIG. 7.

In some examples, a back-up ring may be added to the assembly. For example, a backup ring may be positioned in the groove 142 and take the place of the seal 152. The groove 142 may also be wider so that the groove 142 can accommodate an O-ring seal (e.g., the seal 152) next to the backup ring, for example.

In additional examples, a seal 154 is positioned in the recess 144 disposed in the interior peripheral surface 134 of the valve body 130 and adjacent the opening 146 of the valve body 130. The seal 154 is positioned circumferential to the threaded region 112 of the second portion 108 of the end 102 of the actuator 100 with the actuator 100 inserted into the valve body 130.

Figure 9:
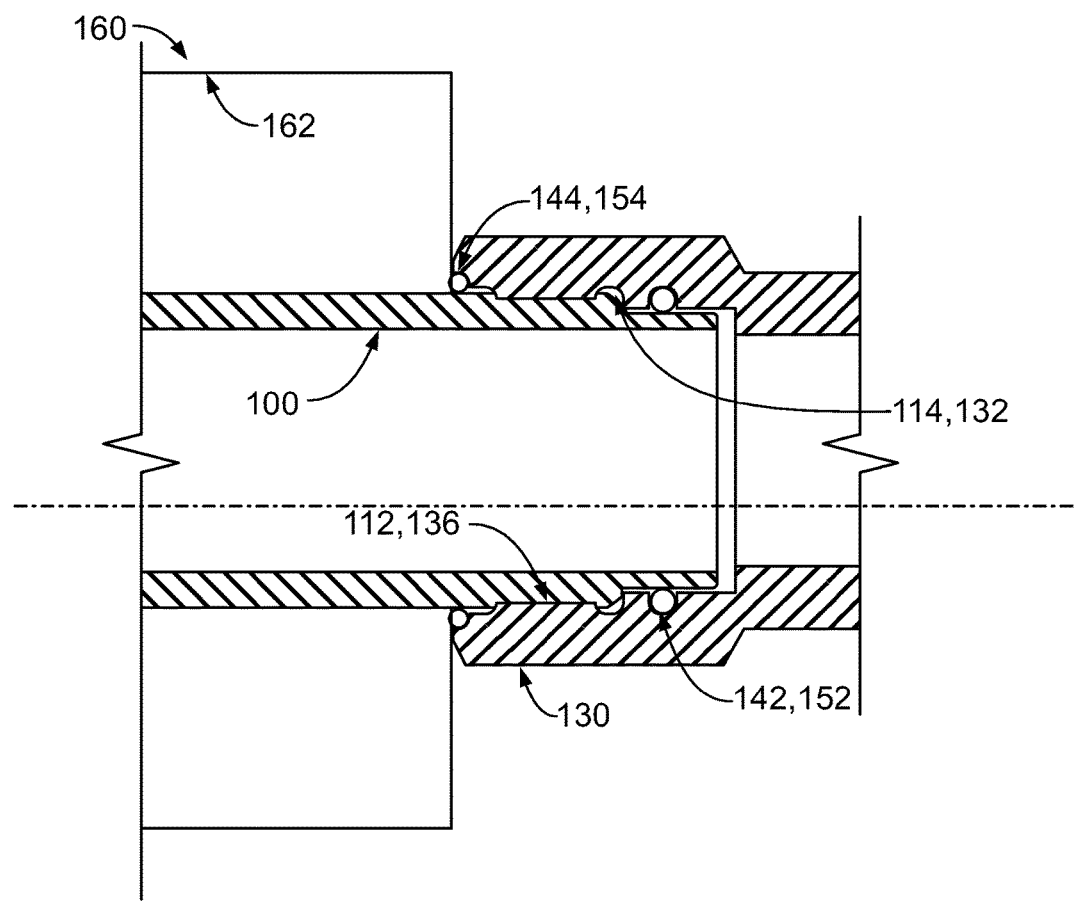
FIG. 9 illustrates a cross sectional view of an example of a portion of an actuator assembly, according to an example implementation.

FIG. 9 illustrates a cross sectional view of an example of a portion of an actuator assembly 160, according to an example implementation. The actuator 100 inserted into the valve body 130 is considered an actuator assembly, for example. Thus, the actuator assembly 160 includes the valve body 130 and the actuator 100 inserted into the valve body 130. In further examples, the actuator assembly 160 includes a solenoid coil 162 positioned over the actuator 100 and abutting the valve body 130. The solenoid coil 162 may slide over the actuator 100 and abut the valve body 130. The solenoid coil 162 is used for actuation, in this example.

The seal 154 may be or include an O-ring seal that may protect the threads and a volume between the actuator 100 and the solenoid coil 162 from moisture and contaminants, for example.

Figure 10:
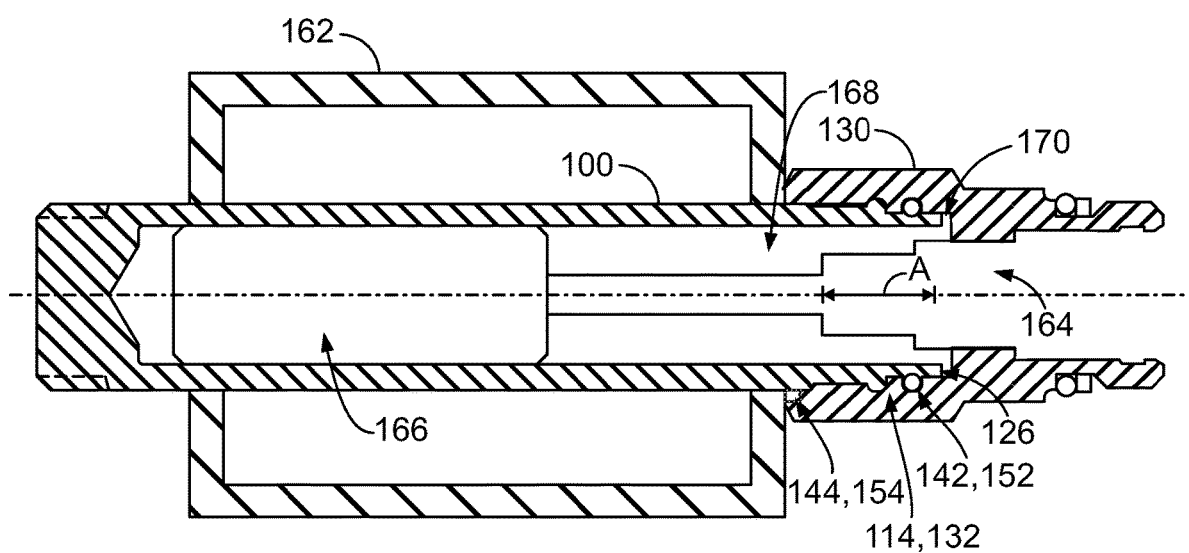
FIG. 10 illustrates another cross sectional view of the actuator assembly, according to an example implementation.

FIG. 10 illustrates another cross sectional view of the actuator assembly 160, according to an example implementation. In FIG. 10, pressurized fluid flows into area 164 during operation of the valve. The actuator assembly 160 is shown to include an armature 166 and a pole piece 168 positioned inside the actuator 100.

The armature 166 (or plunger) is separate from the pole piece 168. Further, the armature 166 may be in contact with a push pin (not shown) disposed in the longitudinal cylindrical cavity of the pole piece 168. When an electric current is provided through the windings of the solenoid coil 162, a magnetic field is generated. The pole piece 168 is fixedly disposed (i.e., stationary or immovable) within the actuator 100 and is composed of material of high magnetic permeability. The pole piece 168 accordingly directs the magnetic field through the airgap toward the armature 166, which is movable and is attracted toward the pole piece 168. In other words, when an electric current is applied to the solenoid coil 162, the generated magnetic field forms a north and south pole in the pole piece 168 and the armature 166, and therefore the pole piece 168 and the armature 166 are attracted to each other. Because the pole piece 168 is fixed and the armature 166 is movable, the armature 166 traverses the airgap toward the pole piece 168.

As the armature 166 moves toward the pole piece 168, it causes the push pin to move axially toward the area 164 to actuate the valve. The actuator assembly 160 may be hydraulically or pneumatically actuated, where a source of pressurized fluid is communicated to the valve body 130.

In some examples, the locating shoulder 114 and/or the body locating shoulder 132 is made of a material and sized such that it is flexible or compliant, so that when subjected to pressure above a threshold by the pressurized fluid, the locating shoulder 114 and/or the body locating shoulder 132 deforms to maintain a predetermined contact force between the valve body 130 and the actuator 100. Thus, when the valve is under pressure, the locating shoulder 114 and/or the body locating shoulder 132 flexes to maintain a high contact force between the actuator 100 and the valve body 130 to prevent un-torqueing or backing-out of the actuator 100, for example. For example, the locating shoulder 114 and/or the body locating shoulder 132 may flex when subjected to pressure acting in a longitudinal direction as shown by arrow A in FIG. 10.

Further, using the configuration shown in FIG. 10 and described herein allows for the seal 152 to be an internal seal located in the groove 142 disposed in the interior peripheral surface 134 of the valve body 130 adjacent the body locating shoulder 132 to further protect and prevent fluid, moisture, or contaminants from exiting the sealed area. The seal 152 is thus positioned proximal to the tapered end 126 of the first portion 104 of the actuator 100, and between the locating shoulder 114 and the tapered end 126 of the actuator 100.

In further examples, using the configuration shown in FIG. 10, the pole piece 168 has a lip 170 positioned in a space between the tapered end 126 of the actuator 100 and the valve body 130. The pole piece 168 is then stationary inside the actuator 100 in this position.

Within one example, for installation of the actuator 100 into the valve body 130, an installation torque of about 11-12 pound-foot (lbf-ft) is used. A location where the actuator 100 meets the valve body 130 (e.g., the locating shoulder 114 abutting the body locating shoulder 132) is thus under an installation torque to hold the components in place. It is desirable to not have the torque be too high that may cause deformation of the locating shoulder 114 and/or the body locating shoulder 132 or may change an axial location of the locating shoulder 114 and/or the body locating shoulder 132. It is also desirable to not have the torque be too low that may cause a coupling of the actuator 100 to the valve body 130 to be too loose. Using a configuration and geometry of the actuator 100 as described herein enables a sufficient amount of surface area for the locating shoulder 114 to couple to the valve body 130, and to limit deformation in that area.

The actuator 100 with threads and configuration of the first portion 104 and the second portion 108 as described enables the actuator assembly 160 to be disassembled easily for maintenance or replacement of parts while also providing an assembly that can be subjected to high force, high internal pressures due to flexibility of the walls of the first portion 104 and the second portion 108 of the actuator 100 and flexibility of the arm 131 of the valve body 130, for example.

Figure 11:
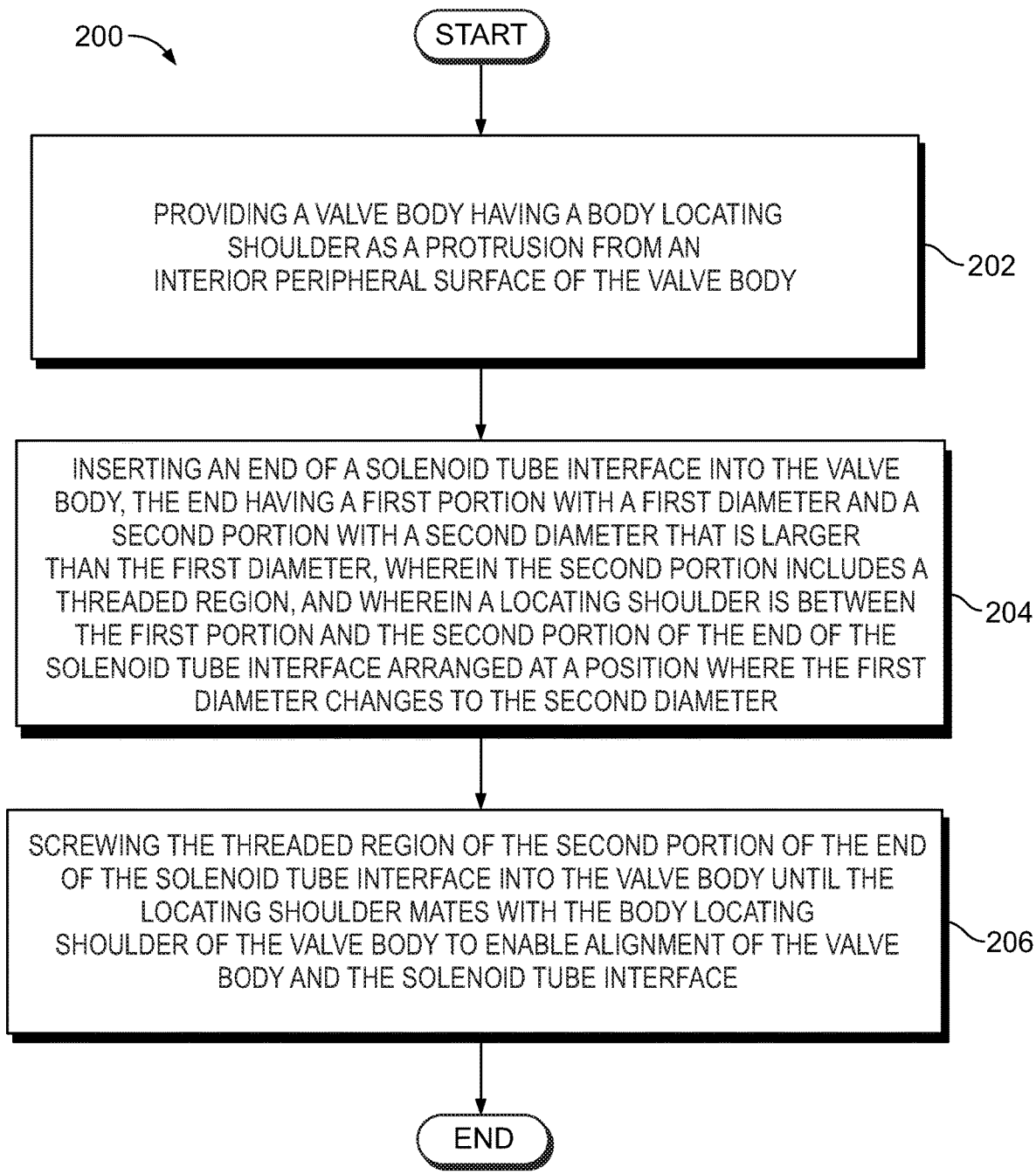
FIG. 11 shows a flowchart of an example method of securing the actuator to the valve body, according to an example implementation.

FIG. 11 shows a flowchart of an example method 200 of securing the actuator 100 to the valve body 130, according to an example implementation. Method 200 shown in FIG. 11 presents an example of a method that could be used with the actuator 100 and the valve body 130 shown throughout the Figures, for example. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes providing the valve body 130 having the body locating shoulder 132 as a protrusion from the interior peripheral surface 134 of the valve body 130. The term "providing" as used herein, and for example with regard to the valve body 130, includes any action to make a component (e.g., the valve body 130) available for use, such as supplying the valve body 130 or bringing the valve body 130 to an apparatus or to a work environment for further processing of the valve body 130 (e.g., mounting other components, etc.).

At block 204, the method 200 includes inserting the end 102 of the actuator 100 into the valve body 130. The end 102 has the first portion 104 with the first diameter 106 and the second portion 108 with the second diameter 110 that is larger than the first diameter 106. The second portion 108 includes the threaded region 112, and the locating shoulder 114 is between the first portion 104 and the second portion 108 of the end 102 of the actuator 100 arranged at a position where the first diameter 106 changes to the second diameter 110.

At block 206, the method 20 includes screwing the threaded region 112 of the second portion 108 of the end 102 of the actuator 100 into the valve body 130 until the locating shoulder 114 mates with the body locating shoulder 132 of the valve body 130 to enable alignment of the valve body 130 and the actuator 100.

FIG. 12 shows a flowchart of additional functions that may be executed and performed with the method 200 of securing the actuator 100 to the valve body 130, according to an example implementation. At block 208, functions include providing the actuator 100 having a thickness of a wall of the first portion 104 more than twice a thickness of threads on the threaded region 112 of the second portion 108

FIG. 13 shows another flowchart of additional functions that may be executed and performed with the method 200 of securing the actuator 100 to the valve body 130, according to an example implementation. At block 210, functions include maximizing a load bearing area of the actuator 100, defined as an annular area between the first portion 104 with the first diameter 106 and the second portion 108 with the second diameter 110, due to a thickness of a wall of the first portion 104 being more than twice a thickness of threads on the threaded region 112 of the second portion 108.

FIG. 14 shows another flowchart of additional functions that may be executed and performed with the method 200 of securing the actuator 100 to the valve body 130, according to an example implementation. At block 212, functions include sealing the first portion 104 of the end 102 of the actuator 100 to the interior peripheral surface 134 of the valve body 130 using the seal 152 positioned in the groove 142 disposed in the interior peripheral surface 134 of the valve body 130 and adjacent the body locating shoulder 132.

Within examples, the actuator assembly 160 enables the actuator 100 to have a thickness of the first portion 104 and the second portion 108 to be reduced as compared to conventional designs, and further enables the actuator 100 to be screwed into the valve body 130 and removed for maintenance.

By the term "substantially" or "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An actuator assembly, comprising:
    a valve body having a body locating shoulder as a protrusion from an interior peripheral surface of the valve body; and
    an actuator having a first end that is inserted into the valve body and a second end opposite the first end, the first end having a first portion with a first diameter and a second portion with a second diameter that is larger than the first diameter, wherein the second portion includes a threaded region, and wherein a locating shoulder is between the first portion and the second portion of the first end of the actuator arranged at a position where the first diameter changes to the second diameter, and wherein the locating shoulder mates with the body locating shoulder of the valve body when the actuator is inserted and screwed into the valve body to enable alignment of the valve body and the actuator, wherein the actuator is hollow and the first portion is at an opening of the actuator and is inserted into the valve body ahead of the second portion, and wherein the first end of the actuator has the opening and the second end of the actuator is closed;
    an armature positioned inside the actuator, wherein the armature is movable inside the actuator;
    a solenoid coil positioned over the actuator and abutting the valve body; and
    a seal positioned in a recess disposed in an interior peripheral surface of the valve body and adjacent an opening of the valve body, wherein the seal is positioned circumferential to the threaded region of the second portion of the first end of the actuator with the actuator inserted into the valve body.

2. The actuator assembly of claim 1, wherein the first portion includes a tapered end abutting the valve body.

3. The actuator assembly of claim 1, wherein the body locating shoulder comprises a material that when subjected to pressure above a threshold, deforms to maintain a predetermined contact force between the valve body and the actuator.

4. The actuator assembly of claim 1, wherein the locating shoulder includes:
   a corner defined by the first diameter changing to the second diameter; and
   a tapered portion abutting the corner and leading into threads of the threaded region of the second portion.

5. The actuator assembly of claim 1, wherein the valve body includes internal threads to mate with threads of the threaded region of the second portion of the first end of the actuator.

6. The actuator assembly of claim 1, wherein a thickness of a wall of the first portion is less than about 2.5 mm.

7. The actuator assembly of claim 1, wherein a thickness of threads on the threaded region of the second portion is less than about 1.1 mm.

8. The actuator assembly of claim 1, wherein a thickness of a wall of the first portion is more than twice a thickness of threads on the threaded region of the second portion.

9. The actuator assembly of claim 1, wherein a spacing of threads on the threaded region of the second portion of the first end of the actuator is about 30-34 threads per inch.

10. The actuator assembly of claim 1, wherein the second diameter is defined to extend to a root of threads of the threaded region of the second portion, and wherein a thickness of threads of the threaded region is about equal to a difference between the first diameter and the second diameter.

11. The actuator assembly of claim 1, wherein a load bearing area of the actuator, defined as an annular area between the first portion with the first diameter and the second portion with the second diameter, is maximized due to a relationship between a thread root diameter of the threaded region of the second portion and a thickness of a wall of the first portion of the first end of the actuator.

12. The actuator assembly of claim 11, wherein the relationship includes a thickness of a wall of the first portion being more than twice a thickness of threads on the threaded region of the second portion.

13. The actuator assembly of claim 1, wherein the first end of the actuator is inserted into the valve body up to a point longitudinally along the first end, and wherein threads of the threaded region on the second portion extend longitudinally along the second portion from the locating shoulder to the point.

14. The actuator assembly of claim 1, further comprising a seal positioned in a groove disposed in an interior peripheral surface of the valve body and adjacent the body locating shoulder, wherein the seal is positioned circumferential to the first portion of the first end of the actuator with the actuator inserted into the valve body.

15. A method of securing an actuator to a valve body, the method comprising:
   providing a valve body having a body locating shoulder as a protrusion from an interior peripheral surface of the valve body;
   inserting an armature inside an actuator, wherein the armature is movable inside the actuator;
   inserting a first end of the actuator into the valve body and a second end opposite the first end, the first end having a first portion with a first diameter and a second portion with a second diameter that is larger than the first diameter, wherein the second portion includes a threaded region, and wherein a locating shoulder is between the first portion and the second portion of the first end of the actuator arranged at a position where the first diameter changes to the second diameter, wherein the actuator is hollow and the first portion is at an opening of the actuator and is inserted into the valve body ahead of the second portion, and wherein the first end of the actuator has the opening and the second end of the actuator is closed;
   screwing the threaded region of the second portion of the first end of the actuator into the valve body until the locating shoulder mates with the body locating shoulder of the valve body to enable alignment of the valve body and the actuator;
   positioning a solenoid coil over the actuator and abutting the valve body; and
   sealing the first portion of the first end of the actuator to an interior peripheral surface of the valve body using a seal positioned in a groove disposed in the interior peripheral surface of the valve body and adjacent the body locating shoulder.

16. The method of claim 15, further comprising:
providing the actuator having a thickness of a wall of the first portion more than twice a thickness of threads on the threaded region of the second portion.

17. The method of claim 15, further comprising:
maximizing a load bearing area of the actuator, defined as an annular area between the first portion with the first diameter and the second portion with the second diameter, due to a thickness of a wall of the first portion being more than twice a thickness of threads on the threaded region of the second portion.

18. An actuator assembly, comprising:
a valve body having a body locating shoulder as a protrusion from an interior peripheral surface of the valve body; and
an actuator having a first end that is inserted into the valve body and a second end opposite the first end, the first end having a first portion with a first diameter and a second portion with a second diameter that is larger than the first diameter, wherein the second portion includes a threaded region, and wherein a locating shoulder is between the first portion and the second portion of the first end of the actuator arranged at a position where the first diameter changes to the second diameter, and wherein the locating shoulder mates with the body locating shoulder of the valve body when the actuator is inserted and screwed into the valve body to enable alignment of the valve body and the actuator, wherein the actuator is hollow and the first portion is at an opening of the actuator and is inserted into the valve body ahead of the second portion, and wherein the first end of the actuator has the opening and the second end of the actuator is closed, wherein the first end of the actuator is inserted into the valve body up to a point longitudinally along the first end, and wherein threads of the threaded region on the second portion extend longitudinally along the second portion from the locating shoulder to the point;
an armature positioned inside the actuator, wherein the armature is movable inside the actuator;
a solenoid coil positioned over the actuator and abutting the valve body.

* * * * *